United States Patent [19]
Lhuillier et al.

[11] Patent Number: 6,061,488
[45] Date of Patent: May 9, 2000

[54] OPTICAL CABLE FOR TRANSFERRING SIGNALS IN A DIFFICULT ENVIRONMENT

[75] Inventors: Bruno Lhuillier, Issoudun; Jean-Marie Houard, Henrichemont, both of France

[73] Assignee: Auxitroc S.A., France

[21] Appl. No.: 09/092,105

[22] Filed: Jun. 5, 1998

[30] Foreign Application Priority Data

Jun. 6, 1997 [FR] France ................................. 97 07034

[51] Int. Cl.[7] .................................................. G02B 6/44
[52] U.S. Cl. ........................................ 385/102; 385/100
[58] Field of Search ........................... 385/102, 100–114, 385/147; 138/110, 103, 149, 124; 174/121 A, 113 R

[56] References Cited

U.S. PATENT DOCUMENTS

| | | | |
|---|---|---|---|
| 4,949,894 | 8/1990 | Winter et al. | 228/148 |
| 5,183,079 | 2/1993 | Blin | 138/110 |
| 5,309,539 | 5/1994 | Sano et al. | 385/106 |

FOREIGN PATENT DOCUMENTS 2 184 512   6/1987   United Kingdom ............ F16L 57/00

OTHER PUBLICATIONS

Patent Abstracts of Japan, vol. 009, No. 221, (p–386), Sep. 7, 1985.
Patent Abstracts of Japan, vol. 011, No. 293 (p–619), Sep. 22, 1987.
Patent Abstracts of Japan, vol. 012, No. 470 (p–798), Dec. 9, 1988.

Primary Examiner—Phan T. H. Palmer
Attorney, Agent, or Firm—Blakely, Sokoloff, Taylor, & Zafman

[57] ABSTRACT

An optical fiber comprising a single optical fiber or a bundle of optical fibers extending inside a metal tube, the optical cable including a braided ceramic sheath interposed between the fiber(s) and the metal tube, said metal tube holding said fibers in place by compressing said sheath.

3 Claims, 1 Drawing Sheet

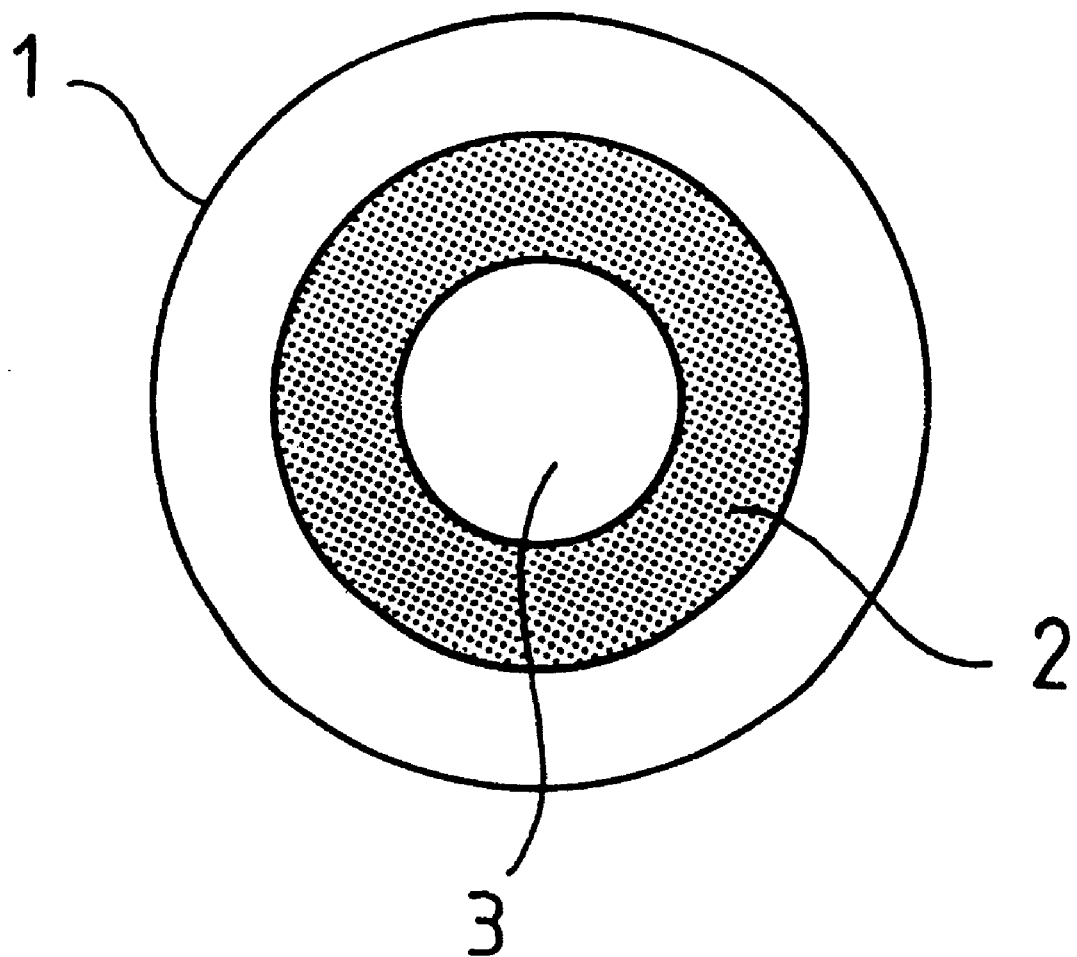
FIG_1

OPTICAL CABLE FOR TRANSFERRING SIGNALS IN A DIFFICULT ENVIRONMENT

The present invention relates to optical cables for transferring signals in a difficult environment.

Here, "difficult environment" refers to an environment in which levels of vibration and temperatures are high.

BACKGROUND OF THE INVENTION

It is known that a high level of vibration jeopardizes the mechanical strength of an optical cable, while high temperature, by damaging the optical cladding of the cable, is liable to degrade its transmission performance.

A particularly advantageous application of the invention is for optical cables designed to be disposed the environment of a hot engine, such as an engine in an airplane, or even a rocket launcher, where temperatures can reach 250° C. to 1000° C., and where rms levels of vibration can reach 200 g in a frequency range of 5 Hz to 20,000 Hz.

In a difficult environment, optical cables are generally used in which a single fiber or a bundle of optical fibers is supported mechanically by a sheath made of an organic or plastics material.

However, such protective sheaths have low bending stiffness. Therefore, when an optical information path having high-frequency modes of vibration needs to be designed, a large number of fixing points must be provided along the cable to ensure that lengths between fixing points are short. The natural frequencies of the cable which lie outside the excitation frequencies of the engine for example, guarantee that it is not resonant, and thus guarantee that it is subjected to mechanical stress that is low, thereby ensuring a long life-time for the device. However, due to the large number of fixing points—generally constituted by rings—such a device turns out to be very costly.

In addition, the use of protective sheaths made of plastics material is severely limited at high temperature. Most conventional materials such as Teflon (registered trademark), Kapton, or polymer materials have temperature limits in use of about 260° C. or less.

To solve the problems of mechanical stiffness and ability to withstand high temperatures, it is known to hold optical fibers in metal tubes which are either stiff, or else of the corrugated type, i.e. constituted by a plurality of hinged elements providing them with a certain amount of deformability.

Nevertheless, with such devices, the fiber(s) must be installed inside the metal sheath with a minimum amount of play, so as to reduce vibrations inside the sheath. To further limit said play, a sheath liner made of ceramic wool can also be added during assembly, said liner being taped around the fiber(s), for example.

However, such a sheath liner can be used over short lengths only (30 cm). Furthermore, even with a sheath liner and little play, the resulting support is not, in general, completely satisfactory.

OBJECT AND SUMMARY OF THE INVENTION

The invention proposes an optical cable which enables those various drawbacks to be solved.

In the invention, the solution consists of an optical cable comprising a single optical fiber or a bundle of optical fibers extending inside a metal tube, the optical cable including a braided ceramic sheath interposed between the fiber(s) and the metal tube, said metal tube holding said fibers in place by compressing said sheath.

BRIEF DESCRIPTION OF THE DRAWING

Other characteristics and advantages of the invention appear further from the following description, which is purely illustrative and non-limiting, and which is to be read with reference to the sole accompanying drawing, which is a diagrammatic cross-section of a cable constituting one possible embodiment of the invention.

MORE DETAILED DESCRIPTION

The cable shown in the FIGURE comprises a metal tube 1, a ceramic sheath 2 inside which there extends a single optical fiber or a bundle of optical fibers 3.

The metal tube 1 is, for example, of the corrugated type. It is made of a material such as stainless steel (registered trademark), of a nickel-based material, or of a super alloy, such as Inconel (registered trademark), X or A230 Hastelloy (registered trademark), etc.

The ceramic sheath 2 is braided. It can be made from materials such as $ZRO_2$, $Al_2O_3$, MgO, $SiO_2$, $B_2O_5$, etc. . . . For example, it is made of NEXTEL (3M trademark) which is a ceramic constituted by silica, boron oxide, and alumina.

The fiber(s) 3 can be of the type made of glass (quartz, silica), or can even be made of plastic.

During manufacture of the above-mentioned cable, the metal tube 1 is shrunk and cold worked so as to reduce the diameter thereof. The fiber(s) 3 is(are) then compressed by means of the ceramic sheath 2 thereby mechanically holding said fiber(s) 3. The braided structure of said sheath 2 prevents the fiber(s) from being damaged during compression.

By way of example, for a cable including a single 400 μm diameter optical fiber, the outside diameter of the tube 1 may be 3.5 mm, and the thickness of said tube may be 0.5 mm.

The above-mentioned structure presents many advantages.

It ensures good mechanical strength for the fiber(s) inside the cable, the compression authorizing an easier optical alignment of the fiber(s).

It provides a cable which is sufficiently stiff, but which can be cold formed for putting into place on an engine.

The cable withstands high temperature and vibrating environments well, and is capable of operating for several hundreds of thousands of hours of flight. It has been already tested with airplane engines.

It can be deformed to follow an engine path.

It will also be observed that the above-mentioned structure allows hermetically sealed cables to be made by welding the metal tube 1.

Having the fibers held inside the sheath and the tube also makes it easier to polish the endpieces of the cable.

What is claimed is:

1. An optical cable comprising a single optical fiber or a bundle of optical fibers extending inside a metal tube, the optical cable including a braided ceramic sheath interposed between the fiber(s) and the metal tube, said metal tube holding said fibers in place by compressing said sheath.

2. A method of making an optical fiber according to claim 1, wherein the optical fiber(s) and the braided ceramic sheath are disposed inside the metal tube, and wherein the metal tube is swaged by shrinking and cold working.

3. The use of an optical cable according to claim 1, in the environment of a hot engine, in particular in an engine of an airplane or a rocket launcher.

* * * * *

UNITED STATES PATENT AND TRADEMARK OFFICE
CERTIFICATE OF CORRECTION

PATENT NO. : 6,061,488
DATED : May 9, 2000
INVENTOR(S) : Lhuillier, et. al.

It is certified that error appears in the above-indentified patent and that said Letters Patent is hereby corrected as shown below:

In [73], delete "Auxitroc S.A." and insert -- Auxitrol S.A. -- .

Signed and Sealed this

Tenth Day of April, 2001

Attest:

NICHOLAS P. GODICI

Attesting Officer     Acting Director of the United States Patent and Trademark Office